H. E. COFFIN.
APPARATUS FOR DRYING EGGS.
APPLICATION FILED AUG. 31, 1909.
977,371.
Patented Nov. 29, 1910.
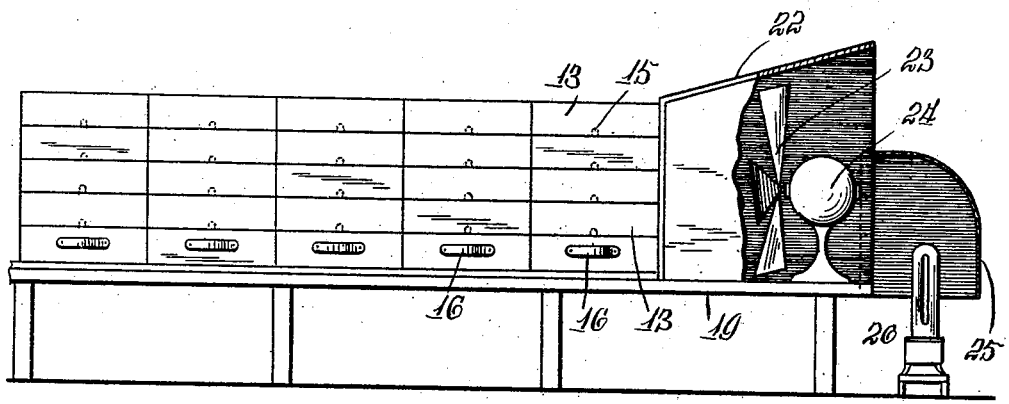
Fig. 1.
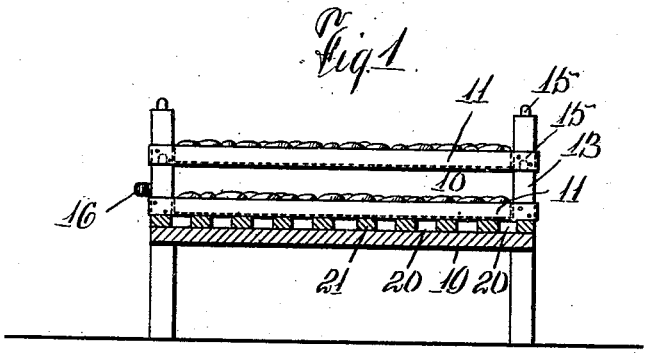
Fig. 2.
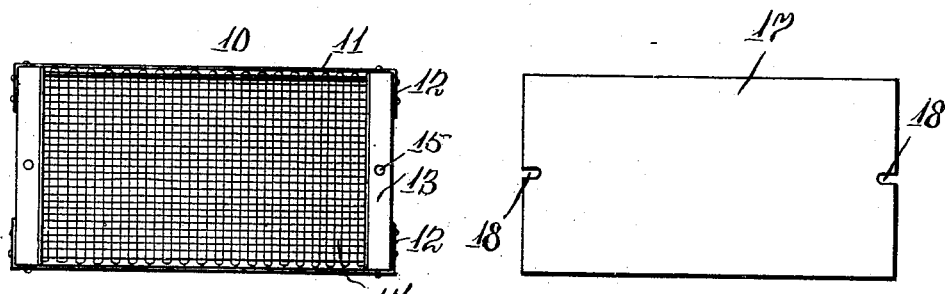
Fig. 3.
Fig. 4.
Witnesses:
Frank L. Stubbs
Arthur G. Dannell
Henry E. Coffin, Inventor,
By his Attorney,
W. B. Hutchinson,

UNITED STATES PATENT OFFICE.

HENRY E. COFFIN, OF HACKENSACK, NEW JERSEY, ASSIGNOR TO BROWN & ROOT COMPANY, OF NEW YORK, N. Y., A CORPORATION OF NEW YORK.

APPARATUS FOR DRYING EGGS.

977,371.      Specification of Letters Patent.      Patented Nov. 29, 1910.

Application filed August 31, 1909. Serial No. 515,456.

*To all whom it may concern:*

Be it known that I, HENRY E. COFFIN, of Hackensack, Bergen county, New Jersey, have invented a new and useful Improvement in an Apparatus for Drying Eggs, of which the following is a full, clear, and exact description.

My invention relates to an improvement in the art of drying eggs, and especially eggs which have been in cold storage. It is the practice to store eggs in large quantities in cold storage apparatus, so that they can be carried for a considerable period without spoiling, and when the eggs are taken from cold storage, they immediately collect large quantities of moisture on the surface, so that the eggs are wet, and in order to be marketable, they must be dried. By the processes generally used, the eggs are dried slowly, and it is therefore a matter of annoyance and of considerable expense. The chief difficulty, however, is that when the eggs are dried in the pasteboard trays in which they are usually carried, the moist eggs absorb, to a certain extent, the qualities of the pasteboard, and this gives to the eggs a disagreeable flavor which detracts from their value.

The object of my invention is to provide means for very quickly and efficiently drying the eggs, and for doing it in a simple and inexpensive manner. In carrying out the process, I have transfer trays, on which the eggs are placed from the pasteboard trays of commerce, and in which they have been stored, the transfer trays corresponding in size to the pasteboard trays, and being a trifle larger, and these transfer trays are arranged and built so that they may be piled one upon the other, and the series of banks of trays will form a chute through which I blow dry air, thus quickly drying the eggs. Further, I arrange the several banks of trays, so that a whole bank or series can be withdrawn from the part next the blower which forces the air through them, and the remaining trays pushed up to take the place of the series which has been removed, so that I can constantly remove the dry eggs without interfering with those which are only partially dry. I also provide means for heating the air so as to promote drying.

Reference is to be had to the accompanying drawings, forming a part of this specification, in which similar reference characters indicate corresponding parts in all the views.

Figure 1 is a side elevation partly in section, showing the manner in which a series of the trays are arranged to dry the eggs thereon. Fig. 2 is a cross sectional view of the apparatus as a whole. Fig. 3 is a plan view of the tray used as a part of the apparatus, and Fig. 4 is a plan view of the tray cover.

The transfer tray 10, which forms a unit of my complete system, is made so as to completely hold the eggs of a pasteboard tray, such as is used in commerce, or it can be made to hold double the quantity carried by the pasteboard trays, this, of course, being a matter of convenience. The tray is provided with side pieces 11, which are preferably, though not necessarily of angle iron, and the end portions of the side pieces 11 are prolonged to form tongues 12, which are doubled around the end pieces 13 on the corners of the tray, and are made fast as shown, thus forming a rectangular tray. The end pieces 13 are considerably higher than the side pieces, and they can conveniently be made of wood. The tray bottom is formed of screening 14, so that the air will pass freely through the bottom, and the screening is attached to the end pieces 13 and side pieces 11 in any convenient manner. The end pieces are provided with tenons 15, which fit into corresponding mortises in the bottoms of the adjacent end pieces when the trays are piled one on the other, as shown clearly in Fig. 2. The tenons form convenient guiding devices and locking devices to temporarily hold the several trays together, but other equivalent devices can be used if preferred.

The end pieces 13 of a portion of the trays are provided with handles 16, so that the trays, and a series of others banked on them, can be conveniently and simultaneously removed.

In practice, the trays are arranged in a series of banks, or groups, as shown in Fig. 1, and the topmost tray of the bank of trays is provided with a cover 17, which has notches 18 to fit around the tenons 15 of the tray.

In practice, the several tray banks or series, after being filled with eggs, are piled on the table 19, and this is provided with longitudinal air ducts 20 formed between the cleats 21, which are attached to the table top. The air when forced through these ducts will therefore rise through the eggs and trays above them.

On the table, and preferably at one end, is a hood 22, which is smaller at one end than at the other, and the smaller end corresponds in size to that of a bank of trays, which are piled opposite it. The hood is open at the outer end and contains some sort of device for blowing air into and through the chute of egg trays arranged in front of the hood. Any blower can be used, but I have shown an ordinary fan 23 run by an electric motor 24.

To further facilitate the egg drying, I provide a flue 25 which delivers into the hood, and a heater 26 of any suitable kind can be arranged in and below the flue, so that the air entering the flue and hood will be heated.

In practice, the several trays are filled with eggs, which are very wet, as soon as they come from the cold storage plant, and the trays are piled one on the other in a series of banks on the table 19, and the covers 17 are placed over the several top trays. In this way a chute is formed, and as the sides 11 of the tray are low, it will be seen that the air can pass freely between the trays, and that it can also rise through the tray bottoms, also that it will pass through the ducts 20 so as to dry the bottom tier as well as the others. As the warm air is blown through the trays, the eggs next the hood 22 are very quickly dried, and as soon as the eggs are dry in this bank of trays, the whole bank can be pulled out by means of the handle 16, and the remaining banks of trays are pushed up a corresponding distance, and the new bank of trays placed behind those already in position.

I am aware that attempts have been made to dry eggs by placing them in an apparatus and exhausting the air from the apparatus, but such a device does not work satisfactorily, because usually the eggs cannot be conveniently handled and the device is costly. The apparatus which I have shown is, however, of the simplest nature, and my process enables the eggs to be very quickly dried.

It will be seen further that the simple arrangement of trays which I have provided enables the eggs to be easily and quickly handled, and that the trays can be readily handled in multiple, and will form a convenient chute when arranged as specified.

Having thus fully described my invention, I claim as new and desire to secure by Letters Patent:

An apparatus of the kind described comprising a table or support having cleats extending longitudinally on the upper surface thereof, a series of separable sections on the top of the table placed side by side and in close contact one with the other, each section comprising a bank of rectangular trays piled directly one upon the other and each tray having its outer or end portions of equal height, sides lower than the ends, and a perforated bottom, a hood connected to one end of the series, and means in the hood to force air longitudinally through the series between the trays and between the cleats.

HENRY E. COFFIN.

Witnesses:
 FREDERICK KODERER,
 FRANK L. STUBBS.